United States Patent [19]

De Fazio

[11] 4,414,750

[45] Nov. 15, 1983

[54] SINGLE STAGE REMOTE CENTER COMPLIANCE DEVICE

[75] Inventor: Thomas L. De Fazio, Watertown, Mass.

[73] Assignee: The Charles Stark Draper Laboratory, Inc., Cambridge, Mass.

[21] Appl. No.: 312,513

[22] Filed: Oct. 19, 1981

[51] Int. Cl.³ ............................................. G01B 5/25
[52] U.S. Cl. ............................... 33/185 R; 33/169 C; 248/614
[58] Field of Search ............. 33/169 C, 172 C, 185 R, 33/189; 248/603, 604, 605, 614

[56] References Cited

U.S. PATENT DOCUMENTS

| | | | |
|---|---|---|---|
| 3,367,609 | 2/1968 | Latter | 248/604 |
| 4,098,001 | 7/1978 | Watson | 33/169 C |
| 4,155,169 | 5/1979 | Drake et al. | 33/169 C |
| 4,202,107 | 5/1980 | Watson | 33/189 |
| 4,276,697 | 7/1981 | Drake et al. | 33/185 R |
| 4,283,153 | 8/1981 | Brendamour | 33/169 C |
| 4,337,579 | 7/1982 | De Fazio | 33/185 R |
| 4,355,469 | 10/1982 | Nevins et al. | 33/169 C |

FOREIGN PATENT DOCUMENTS 553793 6/1943 United Kingdom ............... 248/614

OTHER PUBLICATIONS

Astek Engineering, Inc., "Accommodator", Jan. 1980, pp. 1 and 2.
Drake; Samuel, "Using Compliance in Lieu of Sensory Feedback for Automatic Assembly", Sep. 1977, pp. 1 to 6 and 121 to 135.

Primary Examiner—Richard R. Stearns
Attorney, Agent, or Firm—Joseph S. Iandiorio

[57] ABSTRACT

A one-stage remote center compliance device having full translational and rotational compliance including: first and second spaced monolithic members, one adapted for connection with a supporting device, the other for connection with an operator member, the single stage including at least three discrete elements spaced about the axis of the RCC device and disposed along conically-disposed radii from a focus for interconnecting the members, each element being axially compressible and laterally deformable for providing both rotational and translational compliance about a remote center of compliance external to the RCC device and spaced from the focus.

1 Claim, 3 Drawing Figures

SINGLE STAGE REMOTE CENTER COMPLIANCE DEVICE

FIELD OF INVENTION

This invention relates to a simple remote center compliance (RCC) device having full translational and rotational compliance with only one stage of compliant elements.

BACKGROUND OF INVENTION

Conventional remote center compliance (RCC) devices employ two stages or portions of moveable or deformable elements to provide the necessary combination of independent translational and rotational compliant action. In U.S. Pat. No. 4,098,001 the RCC device has two stages, one which includes elements that lie along radii from a center and provide rotational compliance, and a second which includes elements that are parallel to each other and provide translational compliance. U.S. Pat. No. 4,155,169 discloses an RCC device having two stages, one stage including a set of deformable elements which lie along radii from a center and a second stage including a set of deformable elements which are generally transverse to the first. Each set contributes to both the rotational and translational compliance of the RCC device. In another similar RCC device there are two stages including both parallel and conically-disposed elements which are shear pads. In each case the RCC device, in addition to utilizing two stages, also has two foci, one at the convergence of the radii along which lie the elements and a second whose location may be proximate or even at infinity. Attempts to propose an RCC device with fewer than two stages only went as far as the proposal of the use of an annular element of unkown or unpredictable performance. *Using Compliane in Lieu of Sensory Feed for Automatic Assembly*, Samuel H. Drake, Doctor of Science Thesis, M.I.T., September 1977; see pp. 134–137.

SUMMARY OF INVENTION

It is therefore an object of this invention to provide an improved, simple remote center compliance (RCC) device.

It is a further object of this invention to provide such an improved RCC device which provides full rotational and translational compliance with only one stage.

It is a further object of this invention to provide such an improved RCC device which uses three or more discrete deformable elements.

The invention results from the realization that a single-stage remote center compliance device can be constructed having full rotational and translational compliance.

The invention features a one-stage remote center compliance device having full translational and rotational compliance. There are first and second spaced monolithic members, one adapted for connection with a supporting device, the other for connection with an operator member. The single stage includes at least three discrete elements spaced about the axis of the RCC device and disposed along conical radii from a focus for interconnecting the two monolithic members. The elements are axially compressible and laterally deformable to provide both rotational and translational compliance about a remote center of compliance external to the RCC device, and spaced from the focus. In a preferred embodiment, the elements may be identical to each other and may be equally spaced about the axis of the RCC device. The elements may be compression coil springs or shear pads of metal and elastomeric laminations. Typically, the elements are stiffer in compression than in shear. The remote center of compliance is located between the focus of the axes of said elements, and the RCC device.

DISCLOSURE OF PREFERRED EMBODIMENT

Other objects, features and advantages will occur from the following description of a preferred embodiment and the accompanying drawings, in which.

The invention may be accomplished by a single-stage remote center compliance (RCC) device which has full translational and rotational compliance, even though having but one stage. There are first and second monolithic members which are spaced from each other and are adapted for connection one to a support device, the other to an operator member. The operator member may be a tool, or gripping or docking device, and the support device may be a vehicle to be docked or a robot assembly machine. The operator member may be a salient member to be received for engagement with a recess member, or the operator member may contain the recess and the member with which it is to be engaged may have a salient portion.

The single stage includes at least three discrete elements which are spaced about the axis of the RCC device. The discrete elements lie along conical radii from a focus for interconnecting the two monolithic members.

In one embodiment, for symmetrical operation, the elements are identical to each other and are spaced equally about the axis of the RCC device. However, if asymmetrical operation is desirable, for example if the RCC is to operate with its axis oriented horizontally and carrying substantial weight, then an asymmetrical arrangement whereby more stiffness is provided on the lower side of the RCC to prevent drooping might be desirable. The elements may be any axially compressible and laterally deformable components. Preferably they are shear pads of alternating stiff material and less stiff material, e.g. of metal and elastomeric laminations, or compression coil springs which may be wound helically all in the same direction or in different directions. The elements are usually stiffer in compression than in shear in order to extend the remote center of compliance a useful distance from the structure. The remote center of compliance for the RCC device is located between the focus and the RCC device.

A number of such single-stage remote center compliance devices may be combined in a stacked array wherein each of them has full translational and rotational compliance and may be folded over, as is taught with respect to conventional RCC devices, in order to improve compliance characteristics and vary the configuration.

Figure 1:
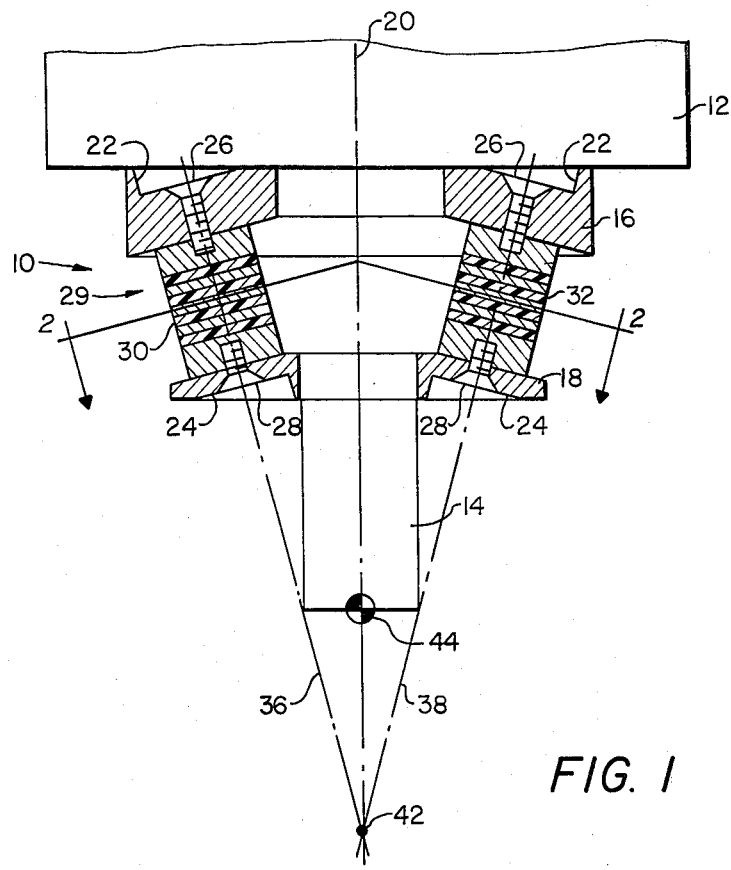
FIG. 1 is a sectional view taken along line 1—1 of FIG. 2 of a one-stage remote center compliance device according to this invention.
Figure 2:
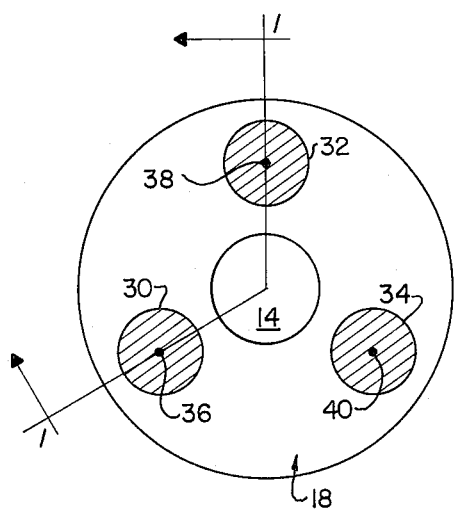
FIG. 2 is a plan sectional plan view taken along line 2—2 of FIG. 1.

There is shown in FIG. 1 a single-stage remote center compliance (RCC) device 10 according to this invention mounted on a supporting device 12 and carrying an operator member 14. RCC device 10 includes upper, 16, and lower, 18, monolithic annular members which are spaced from one another along axis 20 of RCC device 10. Members 16 and 18 may be annular metal plates, each of which contains three recesses, only two of which, 22 and 24, are shown, for receiving mounting screws 26, 28, which threadably engage three discrete elements 30, 32, 34, FIG. 2, of single stage 29. Although only three discrete elements 30, 32, 34, are illustrated in FIGS. 1 and 2, this is not a necessary limitation of the invention, as more than that number may be used. These three elements 30, 32, 34, constitute the only stage of RCC device 10. They are axially compressible and laterally deformable and in combination provide the full rotational and translational compliance basic to the function of an RCC device. Elements 30, 32 and 34 are shear pads of conventional construction using elastomeric and metal laminations or any other combination of alternately stiffer and less stiff materials. Each of elements 30, 32 and 34 lie along conically-disposed radii 36, 38, 40, which converge at focus 42, FIG. 1. This is the single, defined focus or center of the stage consisting of the three elements. The remote center of compliance 44 lies between focus 42 and RCC device 10 at the very tip of operator member 14.

Figure 3:
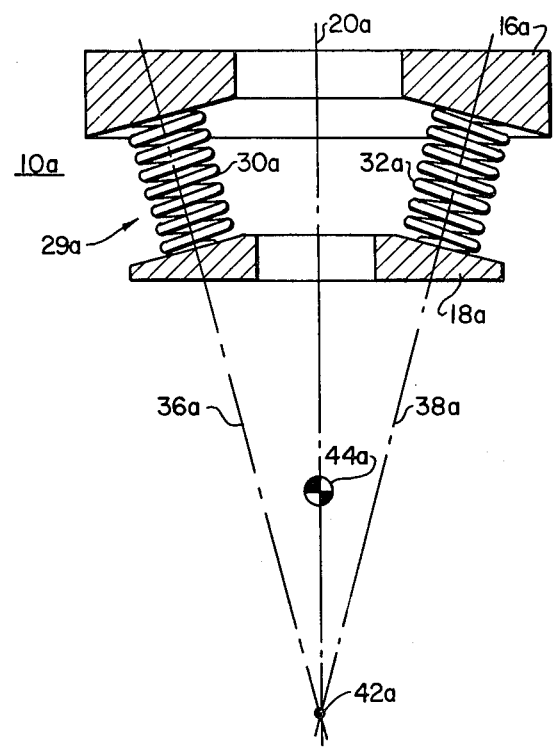
FIG. 3 is a view similar to FIG. 1 of an alternative construction of a one-stage remote center compliance device according to this invention.

Alternatively, the discrete elements may be formed of coil springs 30a, 32a, 34a (not shown), FIG. 3, which may be wound in oppositely directed helical paths as are springs 30a and 32a, or they may be wound all in the same direction. Springs 30a, 32a, and 34a are axially compressible and laterally deformable, and are typically stiffer in the axial direction along the conically-disposed radii and more compliant in shear transverse to those radii. This is so that the remote center 44a is projected a useful distance from the physical structure 10a.

Other embodiments will occur to those skilled in the art and are within the following claims.

What is claimed is:

1. A one stage remote center compliance (RCC) device having full translational and rotational compliance comprising: first and second spaced monolithic members which have a common axis extending therethrough, said stage including at least three discrete compression coil springs spaced about the axis of said monolithic members, each compression coil spring having an axis extending therethrough and being axially disposed along a region conically generated from a focus of the RCC device for interconnecting said monolithic members, each said compression coil spring being axially compressible and laterally deformable for providing both rotational and translational compliance about a remote center of compliance external to said RCC device and spaced from said focus.

* * * * *